(12) United States Patent
Oh (10) Patent No.: US 10,639,564 B2
(45) Date of Patent: May 5, 2020

(54) METAL FILTER HAVING NO CLOGGING AND PERMANENT FILTER ASSEMBLY CONTAINING METAL FILTER

(71) Applicant: ARUN CO., LTD., Incheon (KR)

(72) Inventor: Soon-bong Oh, Incheon (KR)

(73) Assignee: ARUN CO., LTD., Incheon (KR)

( * ) Notice: Subject to any disclaimer, the term of this patent is extended or adjusted under 35 U.S.C. 154(b) by 0 days.

(21) Appl. No.: 16/072,765

(22) PCT Filed: Jan. 19, 2017

(86) PCT No.: PCT/KR2017/000647
§ 371 (c)(1),
(2) Date: Jul. 25, 2018

(87) PCT Pub. No.: WO2017/131385
PCT Pub. Date: Aug. 3, 2017

(65) Prior Publication Data
US 2019/0030465 A1    Jan. 31, 2019

(30) Foreign Application Priority Data

Jan. 27, 2016  (KR) .................. 10-2016-0010214

(51) Int. Cl.
| | | |
|---|---|---|
| *B01D 39/10* | (2006.01) | |
| *B01D 29/085* | (2006.01) | |
| *B01D 29/66* | (2006.01) | |

(52) U.S. Cl.
CPC ......... *B01D 29/085* (2013.01); *B01D 29/661* (2013.01); *B01D 39/10* (2013.01)

(58) Field of Classification Search
None
See application file for complete search history.

(56) References Cited

U.S. PATENT DOCUMENTS 2,592,527 A * 4/1952 Armstrong ............. B01D 25/02
210/347
3,289,843 A * 12/1966 Per Nyrop ................ B04B 3/00
210/196

(Continued)

FOREIGN PATENT DOCUMENTS

DE    197 25 295 A1    12/1998
JP    2011-224450 A    11/2011

(Continued)

OTHER PUBLICATIONS

Extended European Search Report dated Jun. 28, 2019, issued to European Application No. 17744507.9.

(Continued)

*Primary Examiner* — Chester T Barry
(74) *Attorney, Agent, or Firm* — Stein IP, LLC (57) ABSTRACT

The present invention relates to: an improved metal filter having a plurality of apertures which are micropores having a taper shape by which the diameters thereof become narrower from an upstream end towards a downstream end in a state where the directions of the apertures are perpendicular to, or are at an acute angle with respect to the flowing direction of a fluid containing solid foreign substances; and a permanent filter assembly having a filtering pipe connected, in the form of a pitot tube, part-way along a flow pipe in which the fluid containing foreign substances flows, and having the improved metal filter communicatably mounted on the upstream end of the filtering pipe.

15 Claims, 7 Drawing Sheets

(56) References Cited

U.S. PATENT DOCUMENTS

| | | | | |
|---|---|---|---|---|
| 4,209,502 A | * | 6/1980 | Pircon | B01D 45/08 261/76 |
| 4,744,958 A | * | 5/1988 | Pircon | B01D 45/08 261/116 |
| 6,474,685 B1 | * | 11/2002 | Meixner | B60R 21/2644 280/736 |
| 2009/0145841 A1 | * | 6/2009 | Arai | B01D 29/012 210/497.3 |
| 2010/0303673 A1 | | 12/2010 | Hwang et al. | 422/120 |

FOREIGN PATENT DOCUMENTS

| | | |
|---|---|---|
| JP | 2014-147893 A | 8/2014 |
| KR | 20-1991-0006700 U | 5/1991 |
| KR | 10-2006-0037051 A | 5/2006 |

OTHER PUBLICATIONS

International Search Report dated Apr. 28, 2017, issued to International Application No. PCT/KR2017/000647.
Chinese Office Action dated Feb. 3, 2020, issued to Chinese Application No. 20178009033.4.

\* cited by examiner

METAL FILTER HAVING NO CLOGGING AND PERMANENT FILTER ASSEMBLY CONTAINING METAL FILTER

CROSS-REFERENCE TO RELATED APPLICATIONS

This application is a national stage of International Application No. PCT/KR2017/000647, filed Jan. 19, 2017, which claims the benefit of Korean Application No. 10-2016-0010214, filed Jan. 27, 2016, in the Korean Intellectual Property Office. All disclosures of the documents named above are incorporated herein by reference.

TECHNICAL FIELD

This invention relates to a metal filter configured to filter solid materials such as fine particles and microorganisms, and more particularly, to a metal filter having a filtering hole which is not clogged by solid materials and a permanent filter assembly including the metal filter.

BACKGROUND ART

A metal filter is an apparatus formed by disposing a porous metal plate made in a plate shape or a tubular shape in a tubular portion through which a fluid flows to filter foreign substances contained in the flowing fluid.

When such a metal filter is continuously applied to a filtering process, foreign substances are attached to and stuck in holes formed in the metal filter and the holes are clogged.

A metal filter for preventing such holes from being clogged is disclosed in Korean Patent Publication No. 10-2006-0037051.

The disclosed metal filter includes a cylindrical shaped support frame having apertures formed on a side surface thereof and a plurality of thin metal plates surrounding the side surface of the support frame and overlapping each other. Further, a plurality of micropores are formed in the thin metal plates, the micropores have minimum diameters at a central position in a thickness direction, and grooves configured to connect the micropores are formed on a surface of the thin metal plate, which is facing the support frame side, and a surface opposite the surface facing the support frame side, thereby improving filtering efficiency.

Further, in the disclosed metal filter, foreign substances stuck in the micropores are removed by a pulse of air which is ejected in an opposite direction with respect to a filtering direction.

SUMMARY OF INVENTION

Technical Problem

However, in the disclosed metal filter, micropores formed in a metal filter are open in parallel with respect to a direction in which a fluid is transferred, and inner walls of grooves formed to partition the micropores have a hourglass shape, which is enlarged, reduced, and enlarged in a diameter thereof so that the micropores need to be frequently backwashed by a pulse of air due to foreign substances often attaching to the inner walls of the grooves in a state in which a filtering process is stopped.

Furthermore, the disclosed metal filter has a problem in that the foreign substances attached to inner walls of grooves positioned at an upstream end in a filtering direction are not separated from the inner walls of the grooves by the backwash.

Objects of the present invention are to solve the above-mentioned problems.

Solution to Problem

One aspect of the present invention provides an improved metal filter including a plurality of apertures which are micropores having a taper shape with a diameter which gradually decreases from an upstream end towards a downstream end in a state in which directions of the apertures are perpendicular or acute with respect to a direction in which a fluid containing solid foreign substances flows.

Another aspect of the present invention provides a permanent filter assembly in which a filtering pipe in a form of a pitot tube is connected partway along a flow pipe through which the fluid containing the foreign substances flows and the improved metal filter is communicably mounted at an upstream end of the filtering pipe.

Advantageous Effects of Invention

In the present invention, by the above-described solution to problem, a fluid containing foreign substances comes into contact with exposed surfaces of upstream sides of foreign substances stuck in apertures more than exposed surfaces of downstream sides of the foreign substances so that the fluid flows faster on the exposed surfaces of the upstream sides than on the exposed surfaces of the downstream sides, thereby separating the foreign substances stuck in the apertures from the apertures due to lift force which is based on a Bernoulli principle and generated with respect to the foreign substances stuck to the apertures. Accordingly, even when a filtering process for the fluid is performed for a long time, the apertures formed in the metal filter may not be blocked, thereby providing effects that the filtering process can be continuously performed without replacing the filter or cleaning the filter.

DETAILED DESCRIPTION OF EMBODIMENT

Hereinafter, a permanent filter assembly according to the embodiments of the present invention will be described in detail with reference to FIGS. 1 to 3 attached in the present specification.

Figure 1:
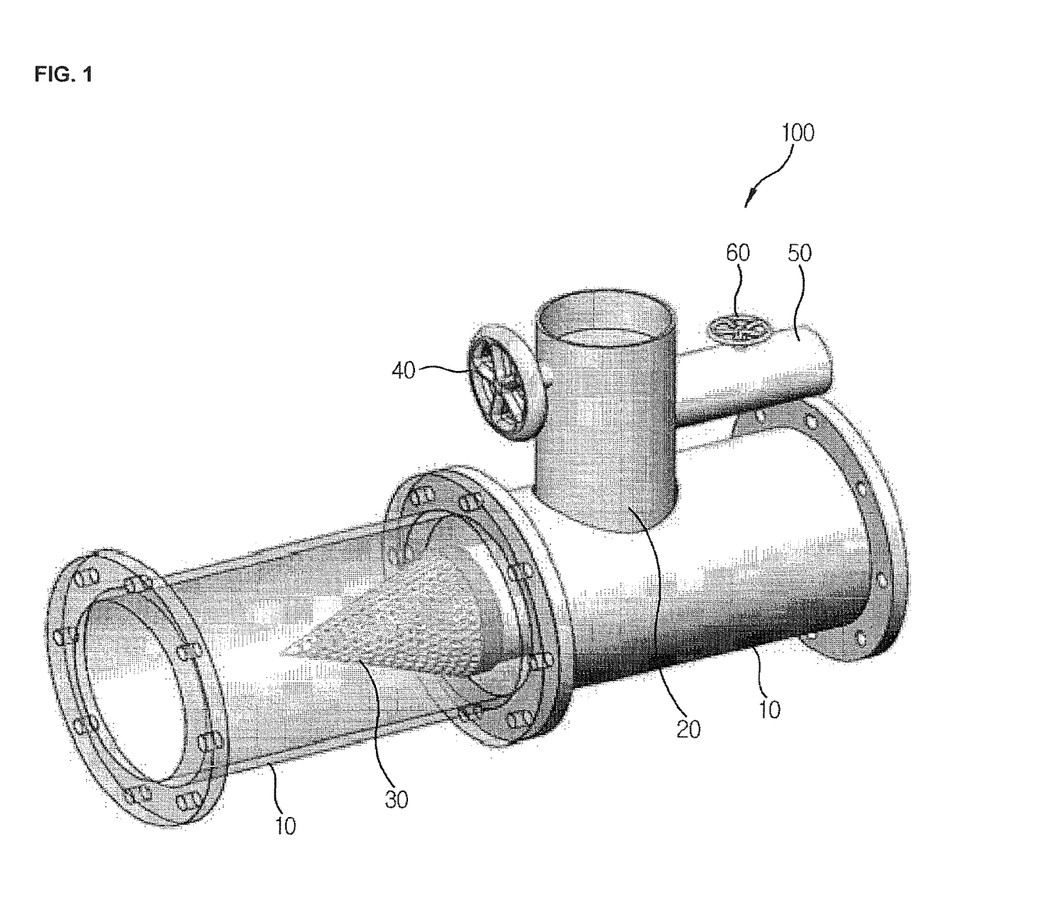
FIG. 1 is an assembled perspective view of a permanent filter assembly according to one embodiment of the present invention.

In FIG. 1, a permanent filter assembly according to one embodiment of the present invention is indicated as numeral 100.

Figure 2:
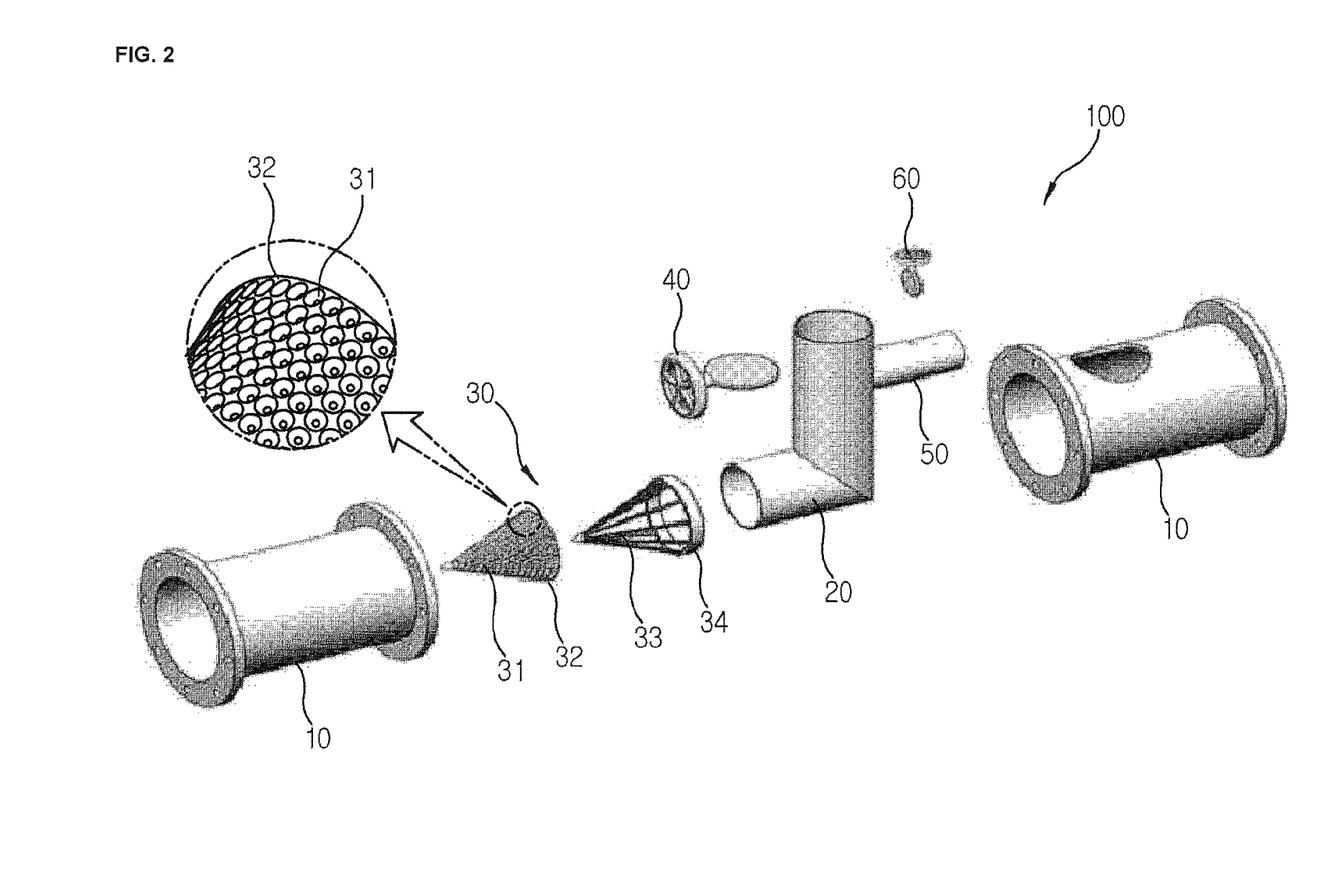
FIG. 2 is an exploded perspective view of the permanent filter assembly of FIG. 1.
Figure 3:
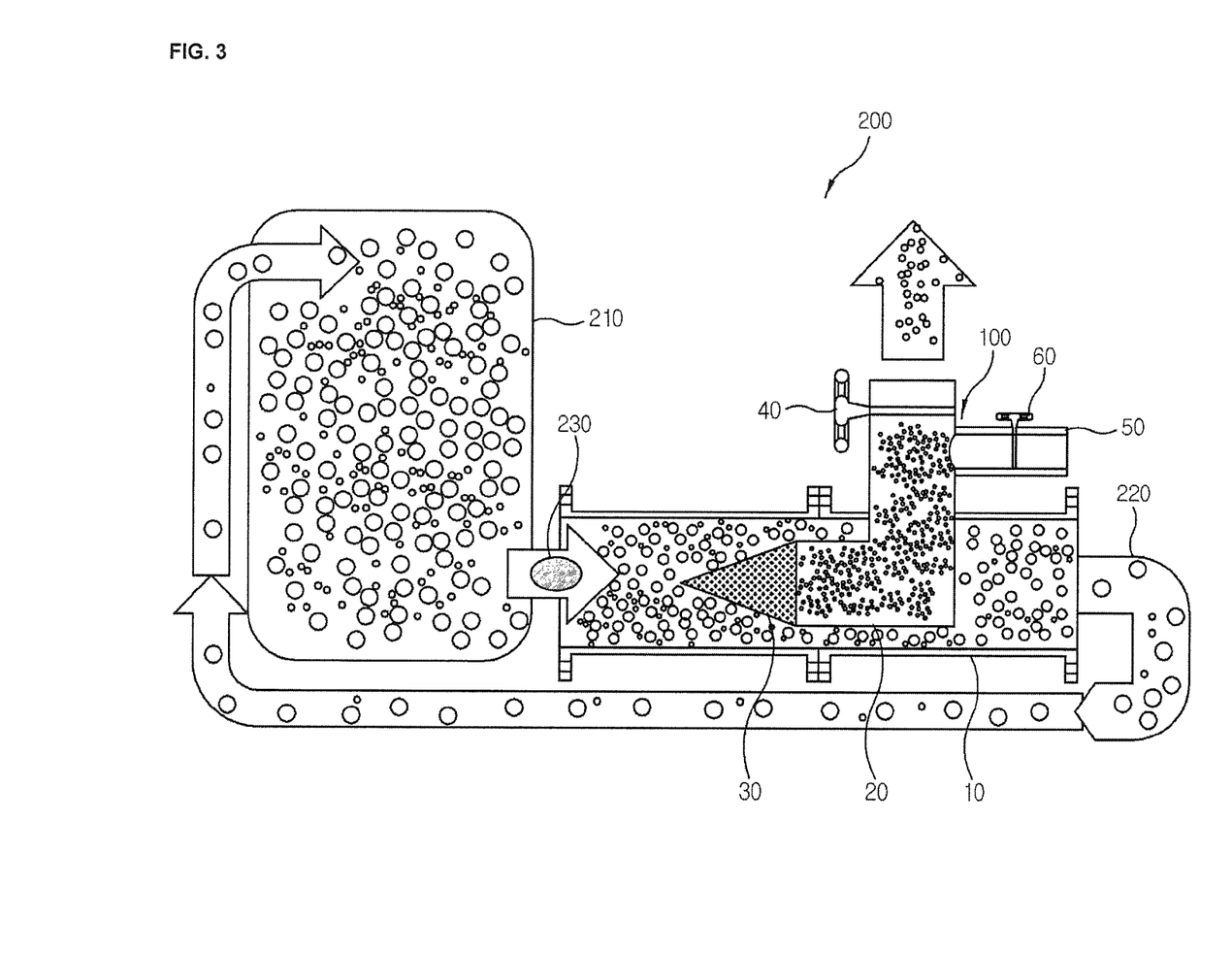
FIG. 3 is a conceptual diagram illustrating a filtering apparatus to which the permanent filter assembly of FIG. 1 is applied.

As shown in FIGS. 1 and 2, the permanent filter assembly 100 includes: a flow pipe 10 communicably interposed partway along a transfer pipe (not shown) through which a fluid containing solid foreign substances is transferred; a filtering pipe 20 connected partway along the flow pipe 10 in a form of a pitot tube; a metal filter portion 30 communicably connected at an upstream end of the filtering pipe 20 disposed in the flow pipe 10 with the same central axis as the filtering pipe 20; a first opening/closing valve 40 disposed on a downstream end of the filtering pipe 20 disposed outside the flow pipe 10; a gas supply pipe 50 having a downstream end communicably connected to a downstream end portion of filtering pipe 20 positioned on an upstream side of the first opening/closing valve 40, and an upstream end communicably connected to a gas supply source (now shown); and a second opening/closing valve 60 interposed partway along the gas supply pipe 50.

The metal filter portion 30 includes: a conical metal filter 32 having a plurality of micropores 31 formed in a lattice pattern with an interval of, for example, 1 μm or less, and formed by bending a metal plate in a conical shape so that a vertex portion thereof is disposed on an upstream side in a direction in which the fluid flows; a plurality of fins 33 fixedly inscribed on the conical metal filter 32 to support the conical metal filter 32; and a connector 34 having an upstream end to which base ends of the plurality of fins 33 are fixed and a downstream end communicably connected to the upstream end of the filtering pipe 20.

The plurality of micropores 31 formed in the metal filter 32 have a taper shape with a diameter which gradually decreases from upstream ends of the micropores 31 to downstream ends of the micropores 31 in a state in which directions of the apertures of the micropore 31 are acute with respect to the direction in which the fluid containing the solid foreign substances flows in the flow pipe 10. For example, the diameter of the upstream end of each of the micropores 31 is in a range of 10 to 100 μm and the diameter of the downstream end of each of the micropores 31 is in a range of 1 to 10 μm.

The ratio of the diameter at the base end side of the conical metal filter 32 to the length of the conical metal filter 32 in the flow direction is, for example, 1:2.

The metal filter 32 may be made of a nickel alloy material having excellent resistance to chemicals and formed by plating the metal filter 32 made of the nickel alloy material with a tungsten alloy to a thickness of 0.5 to 5 μm by an electroless plating method to increase the resistance to chemicals to a higher level.

The flow pipe 10 and the filtering pipe 20 may be plated with a tungsten alloy to a thickness of 10 to 40 μm by an electroless plating method to increase corrosion resistance. The permanent filter assembly 100 configured as described above may be applied to a filtering apparatus 200, as shown in FIG. 3.

The filtering apparatus 200 includes: a pump 230 and a flow pipe 10 of the permanent filter assembly 100, which are sequentially interposed in the direction in which the fluids flows partway along a circulation line 220 having an upstream end communicably connected to a lower portion of a fluid storage tank 210 storing the fluid and a downstream end communicably connected to an upper portion of the fluid storage tank 210; a filtered fluid storage tank (not shown) connected to the downstream end of the filtering pipe 20 of the permanent filter assembly 100; and the gas supply source (not shown) connected to an upstream end of the gas supply pipe 50 of the permanent filter assembly 100.

The filtering apparatus 200, to which the permanent filter assembly 100 configured as described above is applied, may be operated as follows.

First, when the pump 230 is operated in a state in which the first opening/closing valve 40 opens and the second opening/closing valve 60 closes, the fluid containing the solid foreign substances flows from the fluid storage tank 210 and goes to an upstream end of the flow pipe 10 to face the metal filter portion 30. Here, a fluid passing through the plurality of micropores 31 of the metal filter portion 30 among fluids transferred toward the metal filter portion 30 is transferred to the downstream end of the filtering pipe 20 of the permanent filter assembly 100 to be stored in the filtered fluid storage tank as a filtered fluid in which solid foreign substances of 10 μm or more are filtered. Further, a fluid which does not pass through the plurality of micropores 31 of the metal filter portion 30 among the fluids transferred toward the metal filter portion 30 is a fluid containing solid foreign substances of 10 μm or more, and a process of returning the fluid to the fluid storage tank 210 through the downstream end of the flow pipe 10 and a downstream end of the circulation line 220 is repeated, thereby providing the fluid stored in the fluid storage tank 210 to the filtered fluid storage tank as a filtered fluid in which solid foreign substances of 10 μm or more are filtered.

When such a process is continued, the solid foreign substances may be stuck in the plurality of micropores 31, the fluid containing the solid foreign substances having a particle size of at least 10 μm contacts exposed surfaces of upstream sides of the stuck foreign substances more than exposed surfaces of downstream sides of the stuck foreign substances so that the fluid flows faster on the exposed surfaces of the upstream sides than on the exposed surfaces of the downstream sides, thereby separating the foreign substances stuck in the plurality of micropores from the plurality of micropores due to lift force which is based on a Bernoulli principle and generated with respect to the foreign substances stuck to the plurality of micropores, and returning to the fluid storage tank 210. Accordingly, even when a filtering process for the fluid is performed for a long time, the plurality of micropores 31 formed in the metal filter may not be blocked so that the filtering process may be continuously performed without replacing the filter or cleaning the filter.

Even when the plurality of micropores 31 formed in the metal filter portion 30 are clogged by the solid foreign substances, when the pump 230 is stopped, and the first opening/closing valve 40 is closed and the second opening/closing valve 60 is opened, a gas, for example, such as helium that is lighter than air passes through the gas supply pipe 50 and passes through the metal filter portion 30 in reverse and enters the upstream end of the flow pipe 10 so that the metal filter portion 30 may be backwashed. Accordingly, the permanent filter assembly 100 may provide an effect of continuously performing a filtering process without replacing the filter or a filter cleaning operation.

Also, since the metal filter 32 of the metal filter portion 30 is conical, collision between the fluid containing the solid foreign substances and the metal filter 32 is minimized, so that the flow of the fluid containing the solid foreign substances may be stably maintained.

When the diameter of a downstream end of the plurality of micropores 31 is 3 μm, drinking water (water not contaminated with chemicals on the ground) may be produced, and when the diameter of the downstream end of the plurality of micropores 31 is in a range of 10 to 50 μm, ballast water maybe produced.

Further, the permanent filter assembly 100 and the filtering apparatus 200 having the same may be applied to a wastewater treatment process, a semiconductor process, other particle separation processes, or the like.

Figure 4:
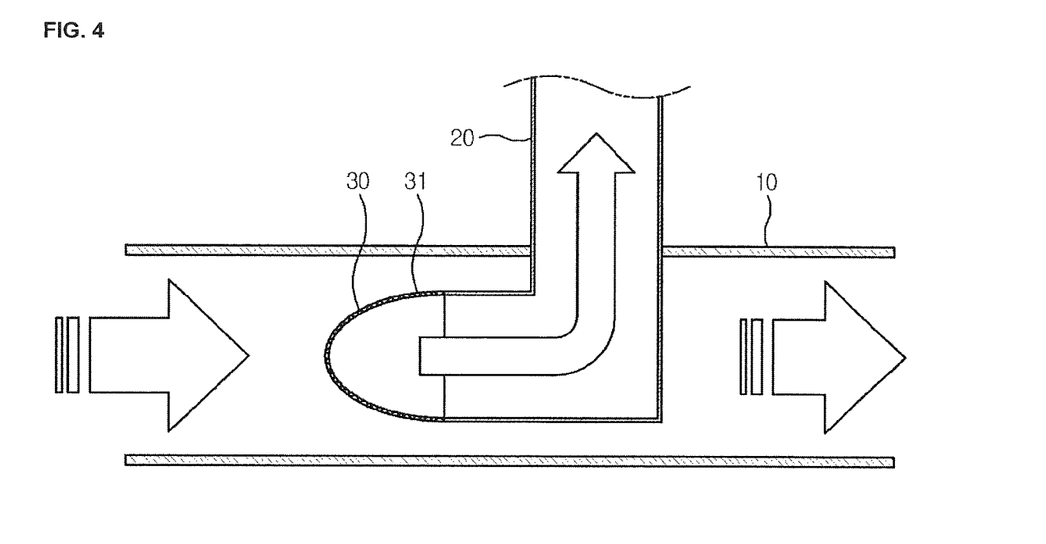
FIGS. 4 to 8 are conceptual diagrams illustrating other embodiments of the permanent filter assembly of FIG. 1.
Figure 5:
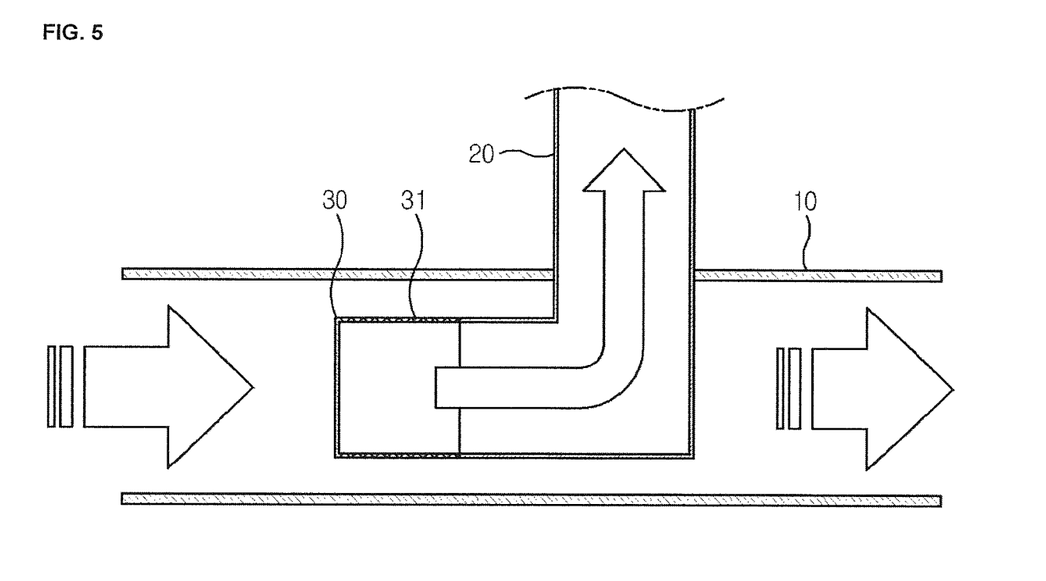
Figure 6:
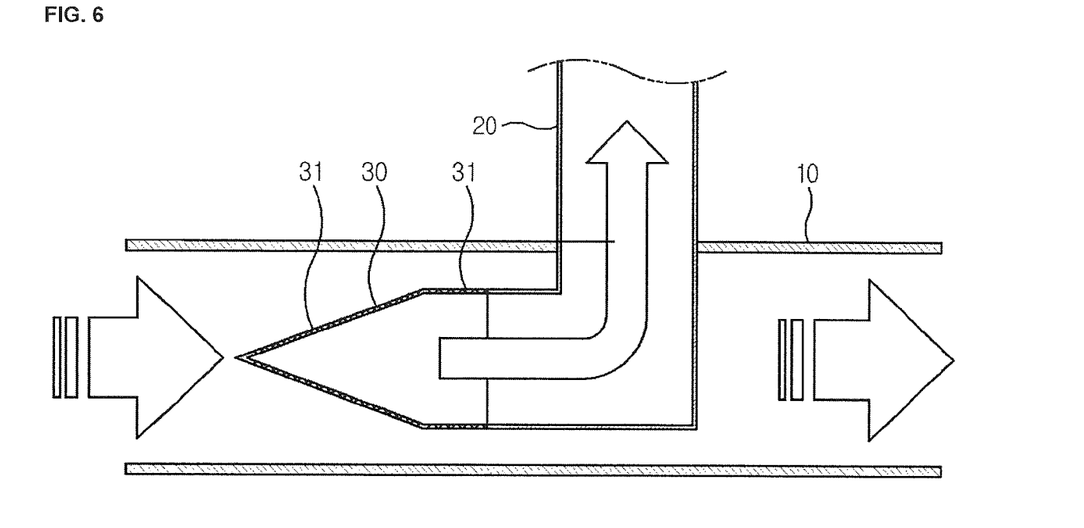

Although the metal filter portion 30 of the permanent filter assembly 100 is described as being conical in the above-described embodiment, the present invention is not limited thereto, and as another embodiment, the metal filter portion 30 may have a dome shape as shown in FIG. 4, a tubular shape as shown in FIG. 5, or a combination type in which a conical portion and a tubular shape are coupled each other as shown in FIG. 6.

Figure 7:
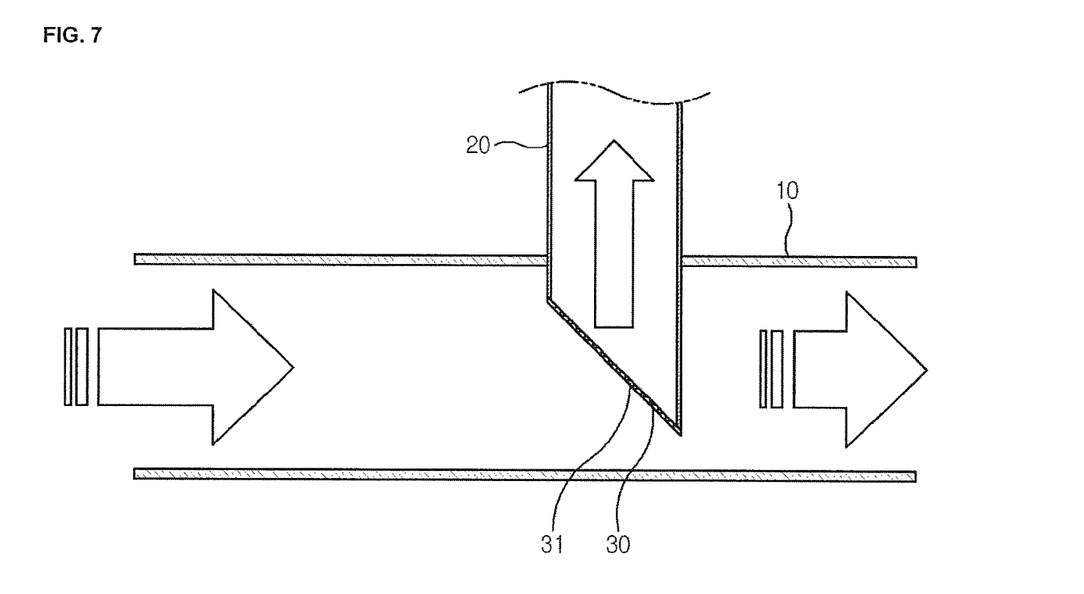

In one embodiment described above, it is described that the filtering pipe 20 is connected to the flow pipe 10 in the form of a pitot tube, that is, the upstream end of the filtering pipe 20 is connected to the flow pipe 10 in such a manner that an upstream end of the filtering pipe 20 extends parallel to the direction in which the fluid flows, but the present invention is not limited thereto. As another embodiment, as shown in FIG. 7, in a state in which the upstream end of the filtering pipe 20 extends perpendicularly to the direction in which the fluid flows in the flow pipe 10, the metal filter 32 of the metal filter portion 30 is formed in a plate shape to be mounted on the downstream end of the filtering pipe 20 to be inclined downward in a direction opposite to the direction in which the fluid flows, and the plurality of micropores 31 formed in the metal filter 32 may have a tapered shape with a diameter which gradually decreases from the upstream end towards the downstream end in a state in which the directions of the apertures are acute with respect to the direction in which the fluid flows.

Figure 8:
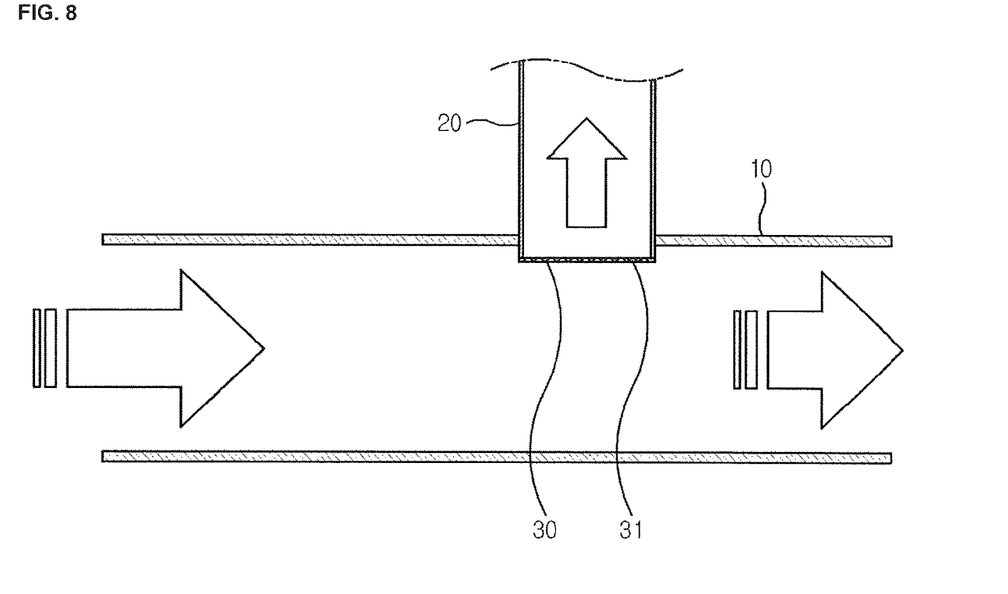

Further, as another embodiment, as shown in FIG. 8, in a state in which the downstream end of the filtering pipe 20 extends perpendicularly to the direction in which the fluid flows in the flow pipe 10, the metal filter 32 of the metal filter portion 30 is formed in a plate shape and mounted on the downstream end of the filtering pipe 20 in parallel to the direction in which the fluid flows, and the plurality of micropores 31 formed in the metal filter 32 may also have a tapered shape having a diameter which gradually decreases from the upstream end towards the downstream end in a state in which the directions of the apertures are perpendicular to the direction in which the fluid flows.

Figure 9:
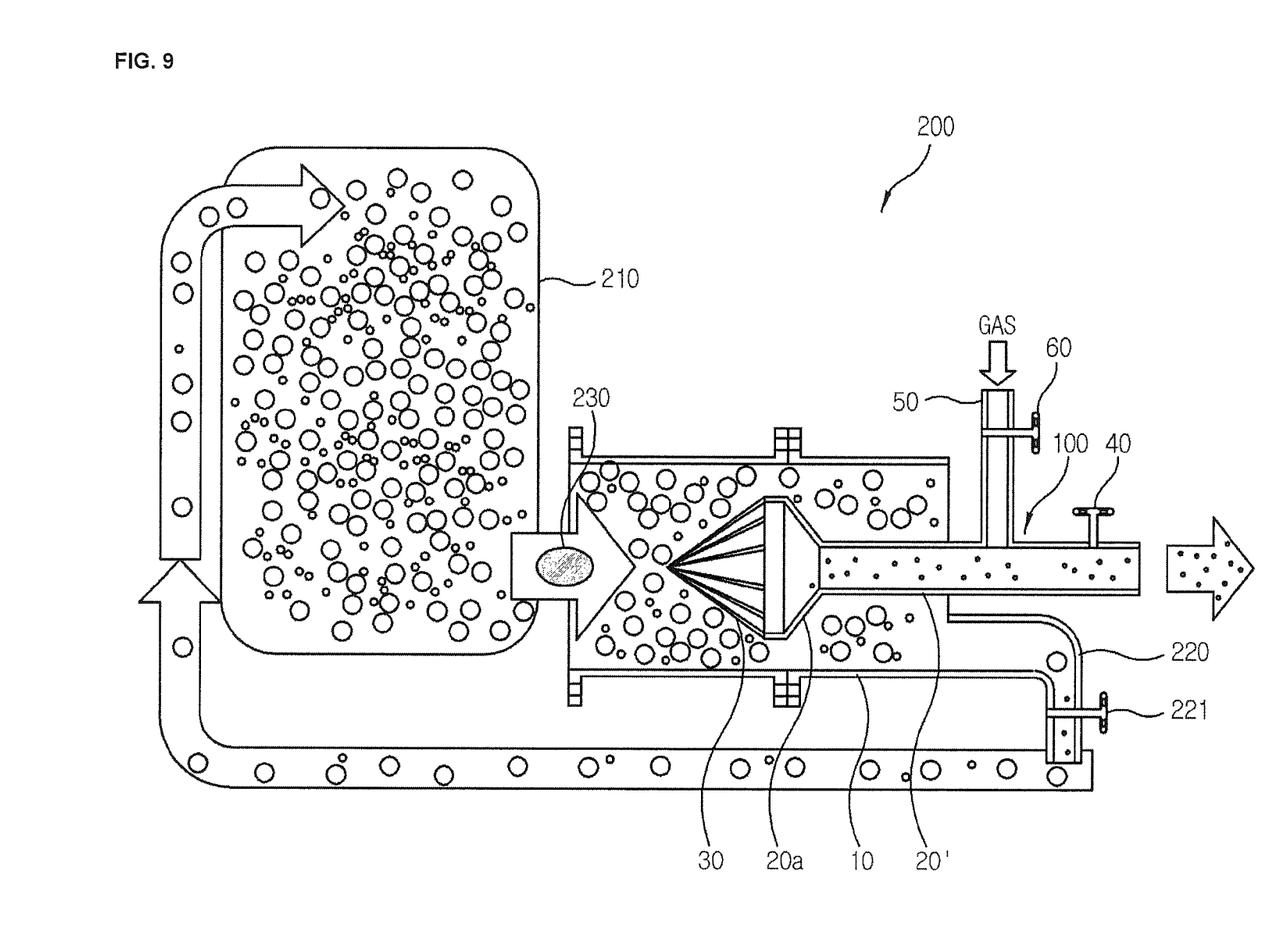
FIG. 9 is a conceptual diagram illustrating still another embodiment of the permanent filter assembly of FIG. 1 and the filtering apparatus of FIG. 3.

Further, in the permanent filter assembly 100 of the above-described embodiment, it is described that the filtering pipe 20 is connected partway along the flow pipe 10 in the form of an L-shaped pitot tube, but the present invention is not limited thereto, and a straight tube type filtering pipe 20' may be substituted for the L-shaped pitot tube type filtering pipe 20 as shown in FIG. 9. Here, an upstream end of the filtering pipe 20' may be communicably inserted into the flow pipe 10 and a downstream end of the filtering pipe 20' communicably connected to the filtered fluid storage tank (not shown) may be disposed outside the flow pipe 10. Also, in a state in which the first opening/closing valve 40 is disposed at the downstream end of the filtering pipe 20', the downstream end of the gas supply pipe 50 may be communicably connected to the downstream end of the filtering pipe 20' positioned on the upstream side of the first opening/closing valve 40, the upstream end of the gas supply pipe 50 may be connected to the gas supply source (not shown), and the second opening/closing valve 60 may be interposed partway along the gas supply pipe 50.

In the embodiments, it is described that the conical metal filter portion 30 is communicably connected to the upstream end of the filtering pipe 20 directly, but the present invention is not limited thereto, and as another embodiment, as shown in FIG. 9, in order to minimize the flow resistance of the fluid, a contraction pipe 20a having a diameter that gradually decreases toward the downstream end thereof is disposed at the upstream end of the filtering pipe 20 so that the conical metal filter portion 30 may be communicably connected.

In the embodiments, it is described that only the pump 230 and the flow pipe 10 of the permanent filter assembly 100 are sequentially connected partway along the circulation line 220 in the direction in which the fluid flows, but the present invention is not limited thereto, and as shown in FIG. 9, a third opening/closing valve 221 may be interposed partway along the portion of the circulation line 220 positioned at a downstream side of the flow pipe 10 to regulate a flow rate and pressure of a filtered fluid discharged through the first opening/closing valve 40.

Although the present invention has been described in connection with the consideration of the above-described embodiments, it is obvious that the invention may include various metal filters and a permanent filter assembly containing the metal filter included within the spirit and scope of the present invention to cover all modifications and equivalents without being limited to the embodiments described above.

What is claimed is:

1. A filter assembly, comprising:
   a flow pipe, having a flow path from a front end of the flow pipe toward a rear end of the flow pipe, wherein a fluid flows along the flow path in the flow pipe;
   a metal filter portion positioned in the flow pipe, the metal filter portion including:
      a metal filter, being positioned in the flow pipe, having a first end adjacent to the front end and a second end adjacent to the rear end, being extended from the first end to the second end;
      a plurality of apertures being formed on the metal filter; and
      a connector being coupled to the second end of the metal filter; and
   a filtering pipe being connected to the connector,
   wherein the metal filter has an outer surface and an inner surface opposite to the outer surface,
   wherein the outer surface faces the flow pipe,
   wherein the plurality of apertures are connected to the outer and inner surfaces,
   wherein a diameter of each of the plurality of apertures decreases from the outer surface towards the inner surface,
   wherein the filtering pipe faces the inner surface,
   wherein the filtering pipe extends from the connector to an outside of the flow pipe, and
   wherein a portion of the fluid flows through the plurality of apertures from the flow pipe to the filtering pipe.

2. The filter assembly of claim 1, wherein the metal filter portion includes a plurality of fins fixed to the connector, and wherein the plurality of fins support the metal filter.

3. The filter assembly of claim 2, wherein the plurality of fins support the inner surface of the metal filter.

4. The filter assembly of claim 1, further comprising:
   a first valve being connected to an outer portion of the filtering pipe;
   a gas supply pipe being connected to the outer portion of the filtering pipe; and
   a second valve being connected to the gas supply pipe, wherein the outer portion of the filtering pipe is positioned outside of the flow pipe.

5. The filter assembly of claim 4, wherein the outer portion of the filtering pipe is connected to a lateral surface of the flow pipe.

6. The filter assembly of claim 1, wherein the metal filter is made of a metal plate.

7. The filter assembly of claim 1, wherein the metal filter has one of a conical shape, a dome shape and a tubular shape.

8. The filter assembly of claim 1, wherein the flow pipe is extended in a first direction, wherein each of the plurality of apertures is extended from the outer surface of the metal filter to the inner surface of the metal filter in a second direction, wherein the first direction is from the front end of the flow pipe towards the rear end of the flow pipe, and wherein the first direction is at an angle with respect to the second direction.

9. The filter assembly of claim 8, wherein the first direction is perpendicular to the second direction.

10. The filter assembly of claim 9, wherein the metal filter is tubular shaped.

11. The filter assembly of claim 1, wherein the flow pipe includes an opening, and wherein the filtering pipe passes through the opening of the flow pipe.

12. The filter assembly of claim 11, wherein the flow pipe includes:

a front portion being adjacent to the front end; and a rear portion, being adjacent to the rear end, being positioned at a rear of the front portion, and being coupled to the front portion, and wherein the opening of the flow pipe is positioned on the rear portion.

13. The filter assembly of claim 12, wherein the filtering pipe includes:

a horizontal portion, being positioned in the flow pipe, being coupled to the metal filter portion; and a vertical portion, being extended from the horizontal portion to the outside of the flow pipe, passing through the opening of the flow pipe.

14. The filter assembly of claim 13, wherein the vertical portion is bent vertically from the horizontal portion.

15. The filter assembly of claim 1, an outer pressure in the flow pipe is greater than an inner pressure in the filtering pipe.

* * * * *